United States Patent [19]

Littell

[11] 4,129,328

[45] Dec. 12, 1978

[54] PLATE HANDLING APPARATUS WITH LOAD DEFLECTION COMPENSATION

[76] Inventor: Edmund R. Littell, 1626 W. North Shore, Chicago, Ill. 60626

[21] Appl. No.: 807,978

[22] Filed: Jun. 20, 1977

[51] Int. Cl.² .............................................. B66C 1/02
[52] U.S. Cl. ..................................................... 294/65
[58] Field of Search ..................... 294/64 R, 65, 65.5, 294/81 R; 214/1 BS, 1 BV, 8.5 D, 650 SG; 271/91, 107

[56] References Cited

U.S. PATENT DOCUMENTS

| 1,110,409 | 9/1914 | Sutherland | 294/65 |
| 1,228,690 | 6/1917 | Monnet | 294/65 |
| 1,373,997 | 4/1921 | Debaecker | 294/65 |
| 1,959,216 | 5/1934 | Owen | 294/65 X |
| 2,359,433 | 10/1944 | McNamara | 294/64 R X |
| 2,622,750 | 12/1952 | Ehlers | 294/65.5 X |
| 2,890,077 | 6/1959 | Littell | 294/65 |
| 2,941,675 | 6/1960 | Noble et al. | 294/65 X |
| 3,223,442 | 12/1965 | Fawdry et al. | 294/64 R |
| 3,361,280 | 1/1968 | Traver | 294/65 X |

FOREIGN PATENT DOCUMENTS

| 369092 | 2/1973 | U.S.S.R. | 294/65 |

Primary Examiner—Johnny D. Cherry
Attorney, Agent, or Firm—Russell H. Clark

[57] ABSTRACT

The invention relates to plate handling apparatus of the type essentially comprising a plurality of vacuum suction cups for gripping a sheet of metal, plastic, glass or the like and wherein power cylinders respectively support and power the suction cups for bodily movement to and from a plate to be lifted and wherein additionally, the suction cups are attached to the end of their piston rod by a ball and socket connection with a member being provided to prevent rotation while permitting swivelling action.

2 Claims, 10 Drawing Figures

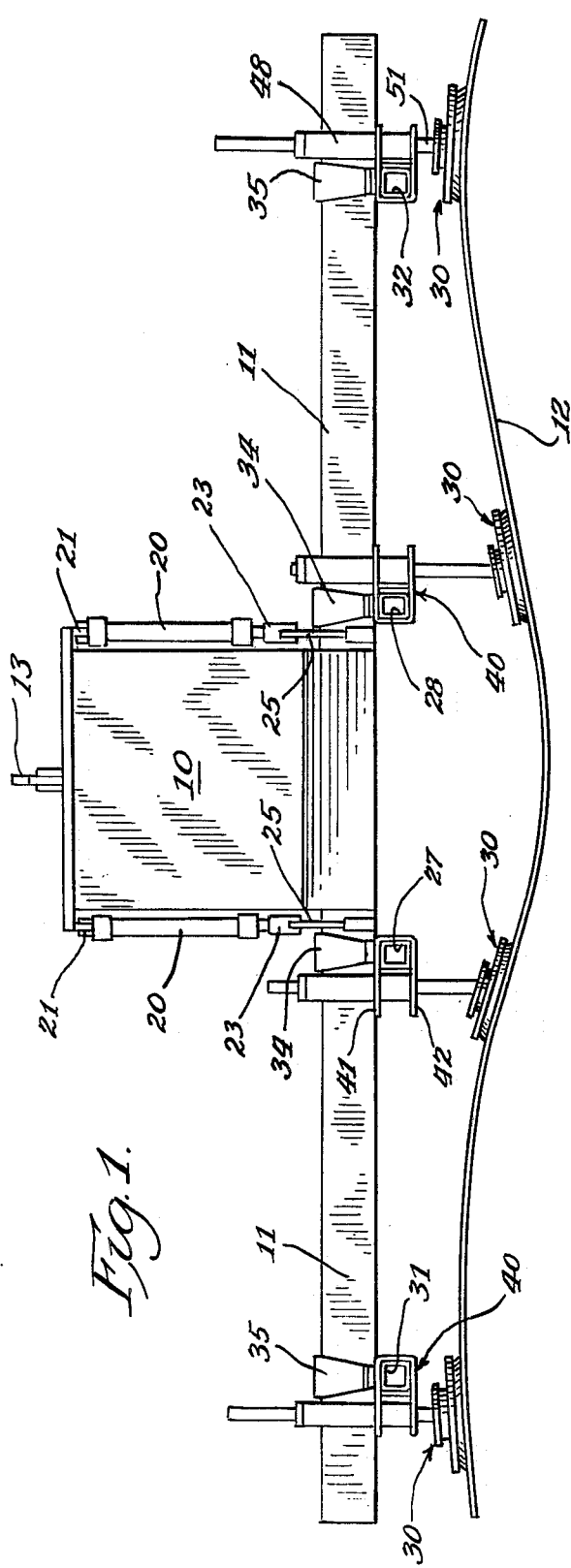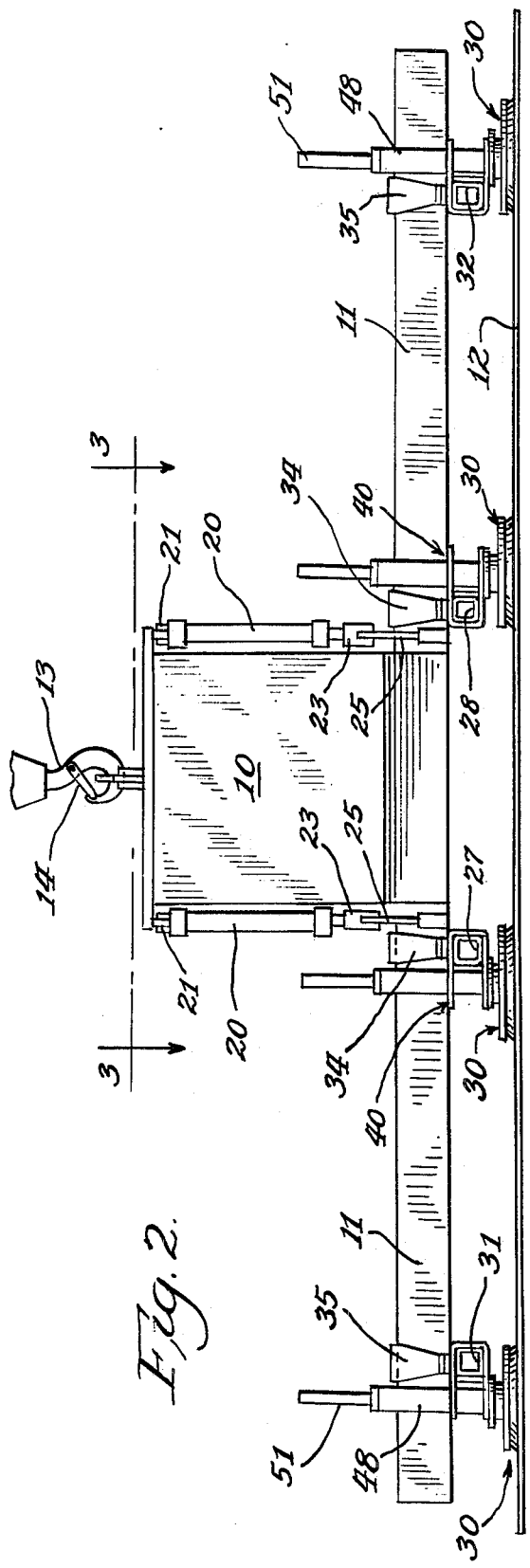

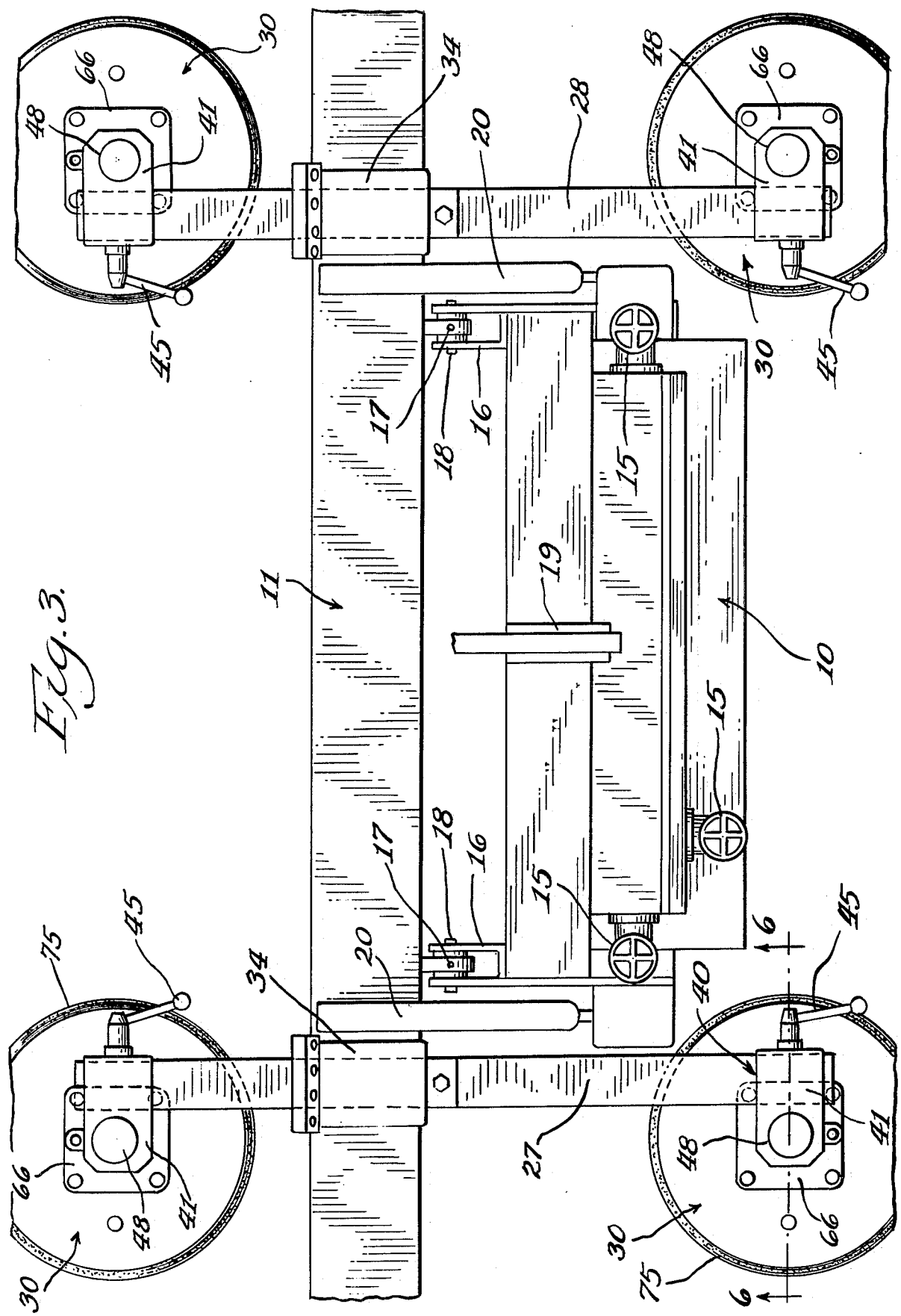

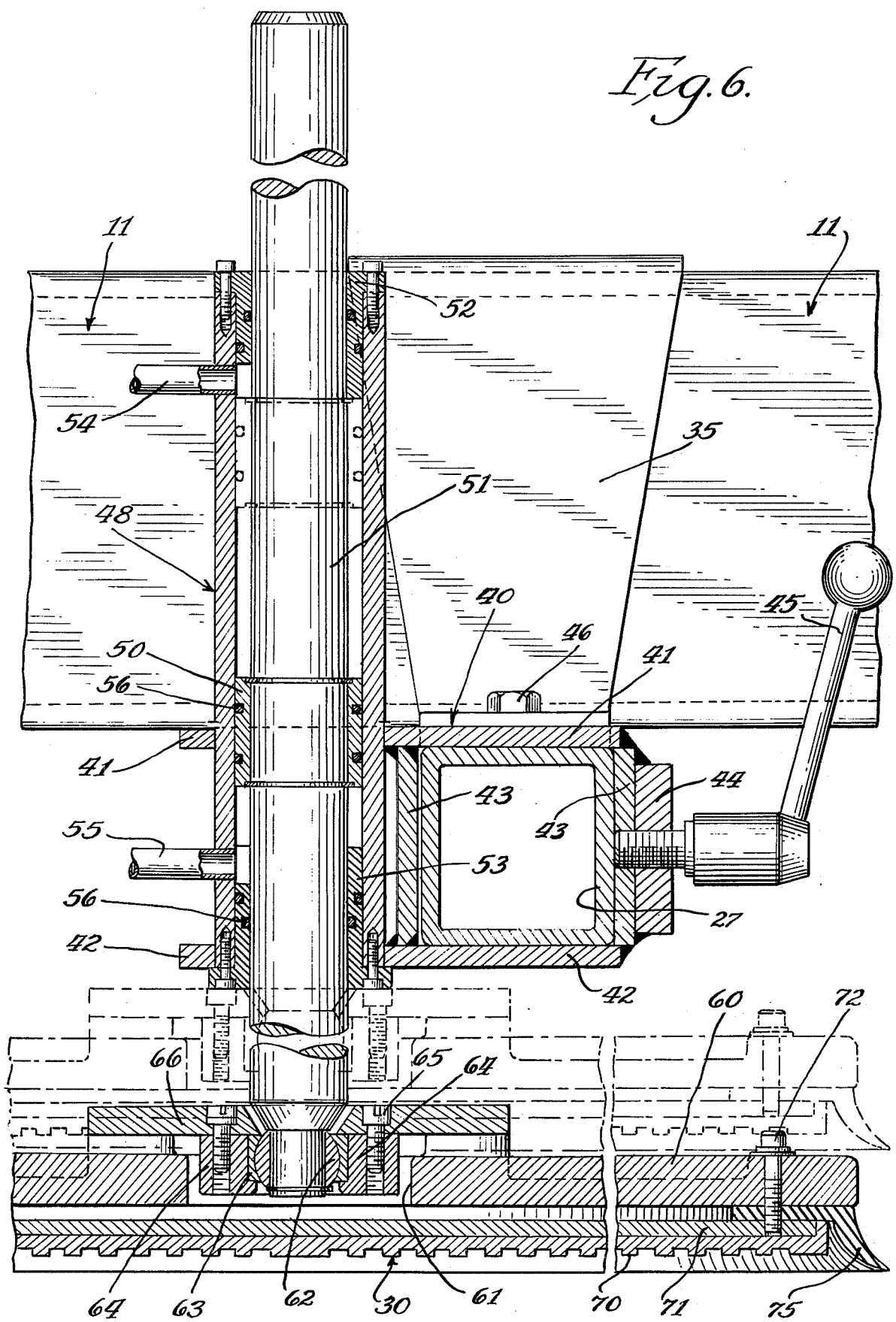

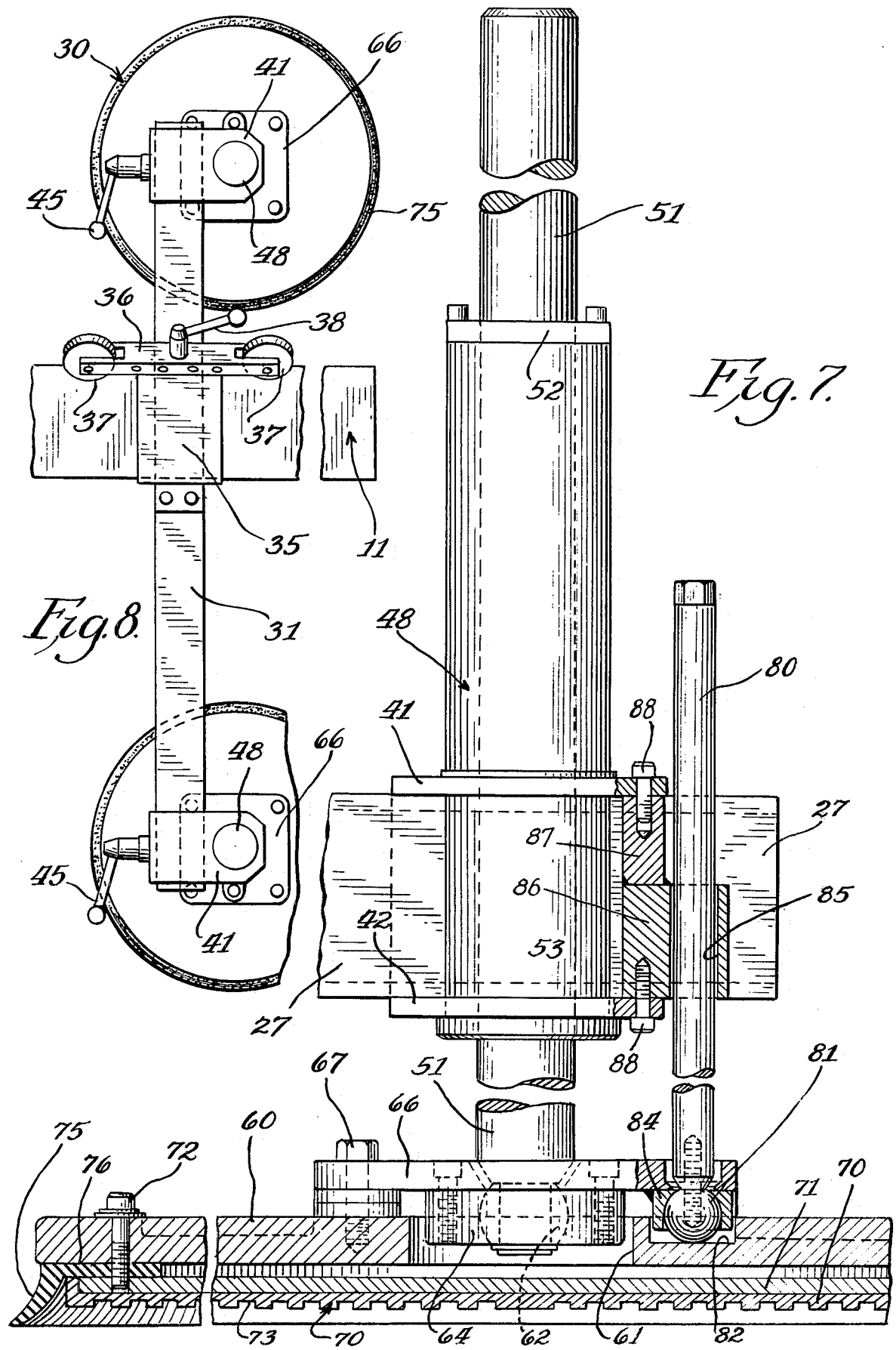

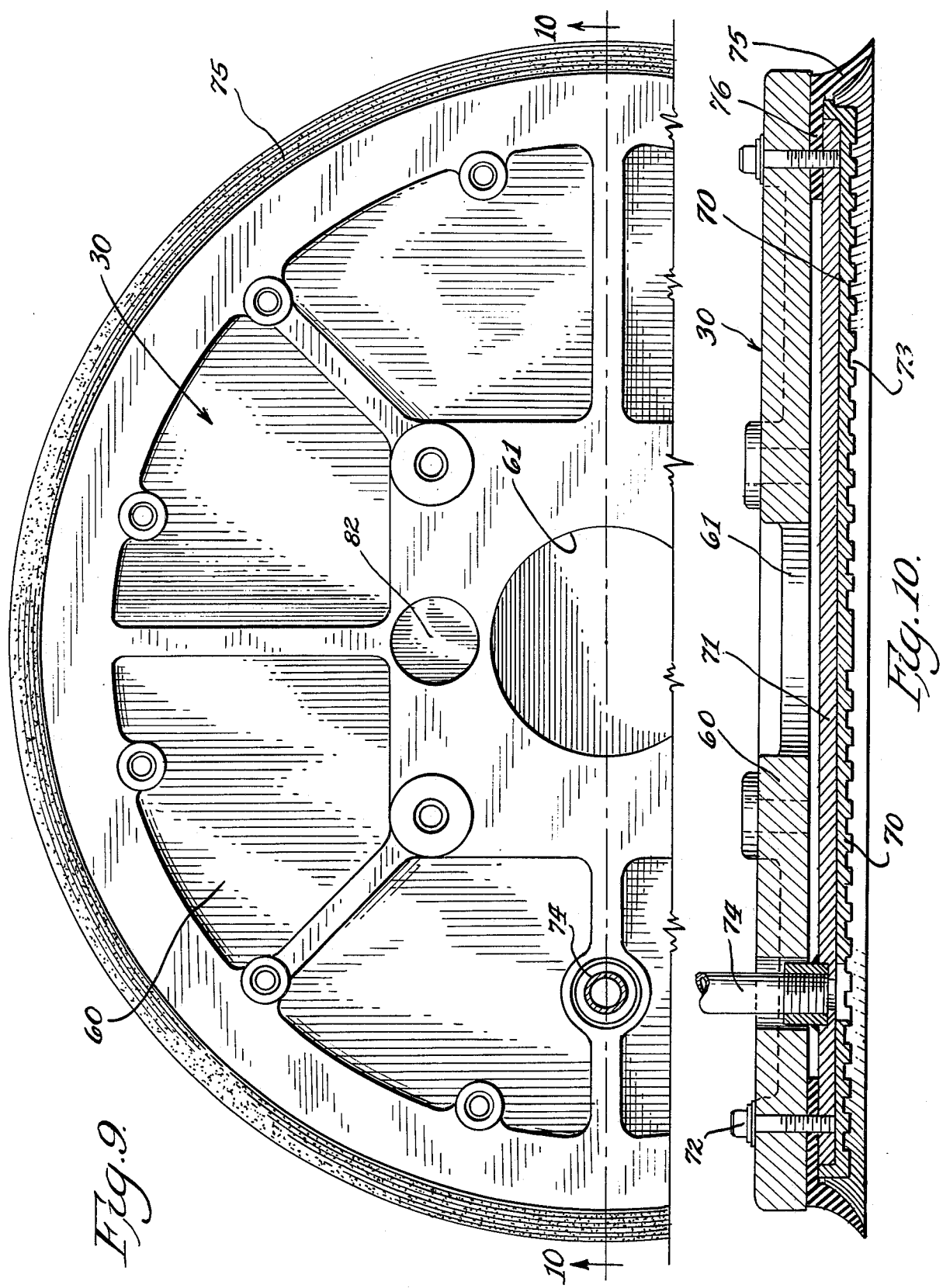

PLATE HANDLING APPARATUS WITH LOAD DEFLECTION COMPENSATION

The invention relates to handling apparatus and has reference more particularly to plate handling appartus such as shown and disclosed in the Littell U.S. Pat. No. 2,890,077 granted June 9, 1959, the apparatus of the patent essentially comprising a vacuum pickup for gripping a sheet of metal, glass, plastic or the like, for rotating the lifted sheet and for also transporting the sheet as by means of an overhead crane from which the apparatus may be suspended.

The present invention has as its primary objective to provide plate handling apparatus capable of improved operation by reason of power cylinders which respectively support and power the suction cups for bodily movement to and from a plate such as a plate to be lifted, whereby the plurality of suction cups individually seat on and attach themselves to the plate notwithstanding that the plate may have an undulating contour and present a wavy surface to the plurality of suction cups.

Another and more specific object resides in providing a plate handling device having individually supported and bodily movable suction cups powered by power cylinders whereby the suction cups can move individually into contact with the surface of a plate to be lifted and thus have seating contact on the plate and then suction gripping of the plate, the said suction cups in this manner compensating for an undulating and wavy surface such as the sheet may present.

Another objective of the invention resides in providing an improved and more efficient plate handling device, wherein the power package or power body portion which is suspended from the crane rotatably supports a load beam permitting limited rotation of the load beam and wherein a plurality of cross arms are carried by the load beam with each cross arm carrying a power cylinder at each end, the piston rod of each power cylinder having a suction cup fixed thereto by means of a ball and socket joint.

Another object is to provide a plate handling device such as described wherein one or more cross arms are moveable on the load beam for adjustment purposes and wherein for similar purposes each power cylinder and suction cup unit is moveable along the length of its cross arm with clamp means being provided for respectively locking each power cylinder and suction cup unit and each cross arm in adjusted position.

A further object is to provide a vacuum plate lifter and upender device which will be capable of selective adjustment as regards the suction cups thereof for plates having various undulating and wavy surfaces and wherein each suction cup is held against rotation on its ball and socket joint to prevent fouling and tangling of the suction conduits connecting with the suction cups.

With these and other objects in view, the invention may consist of certain novel features of construction and operation as will be more fully described and particularly pointed out in the specification, drawings and claims appended hereto.

In the drawings which illustrate an embodiment of the apparatus and wherein like characters are used to designate like parts, FIG. 1 is a front elevational view of the plate handling apparatus of the invention showing the same in an initial operating position with the plurality of suction cups in suction contact with the wavy surface of a plate;

FIG. 2 is a front elevational view similar to FIG. 1 but illustrating the aligned position of the suction cups for lifting a substantially flat plate;

FIG. 3 is a top elevational view on an enlarged scale, taken substantially on line 3—3 of FIG. 2 and looking in the direction of the arrows;

FIG. 6 is a sectional view taken on line 6—6 of FIG. 3 and showing in detail and on an enlarged scale a power cylinder and piston with ball and socket means for connecting with a suction cup, the sectional view also illustrating the manner of mounting the power cylinder and suction cup unit for slidable movement on a cross arm;

FIG. 7 is a view partly in section taken substantially on line 7—7 of FIG. 4 and showing in detail a suction cup, its ball and socket mounting on the depending end of a piston rod and the anti-rotation rod for preventing rotation of the suction cup;

FIG. 8 is a fragmentary plan elevational view illustrating the adjustability of a cross arm on the load beam which supports it for slidable transverse movement and additionally showing the manner of slidably mounting a cross arm on the load beam;

FIG. 9 is a fragmentary top plan view showing the top surface of a suction cup; and FIG. 10 is a vertical sectional view taken substantially along line 10—10 of FIG. 9.

Figure 4:
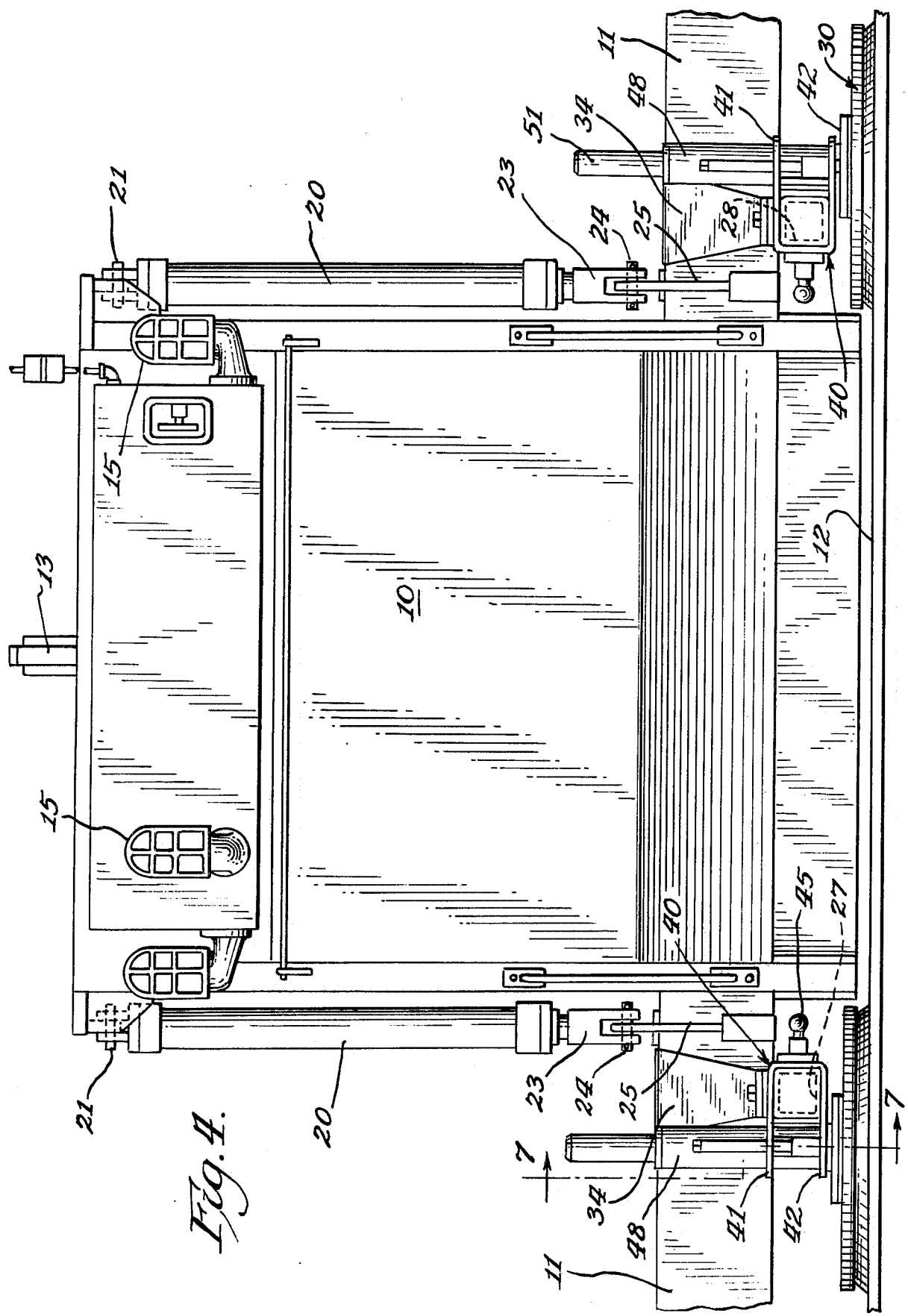
FIG. 4 is a front elevational view of the apparatus as shown in FIG. 3.

Referring to the drawings and in particular to FIGS. 1, 2, 3 and 4 it will be observed that the plate handling device of the invention consists essentially of a power package or power body portion 10 having a load beam 11 pivotally supported on the body portion and thus capable of rotation. The load beam is bodily rotatable with respect to the body portion, although to a limited extent, for upending a lifted sheet such as designated by numeral 12. The power body portion may be suspended from a crane or the like which provides the hook 13 connecting with frame part 19 and having a safety latch 14. The body portion is preferably formed of metal being substantially rectangular in front elevation and of sufficient depth to house the motors for producing the vacuum for the suction cups and for generating the high pressure hydraulic medium for the power cylinders. The vacuum reservoir and the reservoir for the hydraulic medium are also housed in the body portion in addition to other equipment such as the switches, relays and the like. The numerals 15 on the body portion refer to the indicator lights for indicating to the operator the pressure of the hydraulic medium, the vacuum pressure and such other conditions of the equipment as the operator may need to know for efficient operation.

The load beam 11 or torsion beam is pivotally supported on respective sides of the power body portion 10 by means of the U-shaped brackets 16, best shown in FIG. 3, and which receive a pivot stud 17 integral with and projecting outwardly from the load beam. The parts are pivotally connected by the pivot pin 18. The load beam 11 is thus carried by the body portion 10 in a pivoted manner and movement of the beam is produced and controlled by one or more power cylinders 20 which are shown as hydraulic cylinders although other forms of power may be used such as jack screws. Each power cylinder 20 is pivotally connected at its upper end as at 21 to the frame structure of the body portion and the depending end of piston rod 22 of the power cylinder is provided with the clevis 23 which is pivotally connected at 24 to the elbow shaped lever arm 25, see FIG. 5. The lever arm is suitably fixed to the load beam and the same extends towards the body portion for pivotal connection at 24 to the piston rod 22 by means of the clevis 23.

For rotating the load beam 11 on its pivot pins 18, it is only necessary to cause actuation of the power cylinder 20 by admitting an hydraulic medium under pressure to the top end above the piston thus driving the piston and piston rod downwardly to thereby force the lever arm 25 downwardly around the pivot pins 18. This turning action will bodily rotate the load beam around its pivot axis 18 for upending a sheet such as may be supported by the load beam. One or two cylinders 20 may be employed which are conveniently located along side of the body portion and of course other forms of power may be used for the turning action of the load beam. Each cylinder 20 is preferably hydraulic and they control the movement of the load beam by means of valved structure within the cylinder or associated therewith so as to limit out flow and prevent collapse or a too fast descent of the supported plate.

For gripping the plate 12 which may be of metal, glass or plastic the invented apparatus employs a plurality of suction cups designated by numeral 30 and shown in detail in FIGS. 9 and 10 and which are associated with the load beam being supported thereby by means of new and novel suction cup structure. Said structure gives to the present apparatus an improved mode of operation. A plurality of cross arms are carried by the load beam and each cross arm in turn carries a pair of suction cups. The cross arms 27 and 28 are located on the underside of the load beam and said arms are disposed on respective sides of the body portion 10 relatively adjacent thereto. The cross arms 31 and 32 are also located on the underside of the load beam but the same are disposed adjacent the respective outer ends of the beam. The invention contemplates that cross arms 27 and 28 have a fixed position on the load beam and accordingly each bracket 34 extends around three sides of the beam and has a bolted connection to its cross arm. Whereas cross arms 27 and 28 are fixed, the cross arms 31 and 32 are movable longitudinally on the load beam and such movement is permitted by the respective brackets 35. Here again a bracket extends around the load beam on three sides thereof and has a secured connection to a cross arm. The construction of the brackets 35 permits movement of the cross arms 31 and 32 longitudinally along the load beam. This movement of the cross arms allows adjustable positioning of the suction cups carried by the arms. The movement is facilitated by the trolley brackets 36, FIG. 8, providing the trolley wheels 37 which ride on the corner of the load beam as the cross arms 31 and 32 are moved for adjustment purposes. The clamp 38 is provided for locking in adjusted position each trolley bracket 36 and also its respective bracket 35.

Each cross arm, whether fixed or movable, carries a pair of suction cups 30, as best shown in FIGS. 6 and 7, and it will be understood that the supporting means for each power cylinder and suction cup unit is slidable on its cross arm. Each said supporting means includes a built-up bracket 40 and wherein top and bottom plate sections 41 and 42 are welded to side plate sections 43 with an additional side plate member 44 being welded to 43 for threadingly carrying the hand clamp 45. A top plate section 41 is secured by bolts 46 to the brackets 34 and 35 respectively, 34 being fixed and 35 being slidable on the load beam. Each pair of plates 41 and 42 extend to the left of their cross arm, FIGS. 6 and 7, and said plates receive and they support the casing of a power cylinder 48, the same being positioned vertically and having a reciprocating piston 50 and piston rod 51. The tubular cylinder 48 is closed at its upper end by the collar member 52 through which the piston rod extends to project above the same and said cylinder is similarly closed at its base end by the collar member 53 with the piston rod also extending through the same. The conduit 54 connects with the casing of the power cylinder 48 just below the collar 52 and thus a pressure medium can be admitted to and exhausted from the space above the piston 50. A similar conduit 55 connects with the cylinder 48 close to but above the collar 53 and a pressure medium can also be admitted and exhausted from the space below the piston. When the pressure medium is supplied above the piston by the conduit 54 and exhausted by conduit 55, the piston and also the piston rod is caused to move down. When the pressure medium is admitted by the conduit 55 and exhausted by 54 the piston and the rod will move upwardly. Both collar members may be provided with oil seals 56 for more effectively sealing the parts against leakage of the high pressure medium, and similar seals may be located on the piston 50.

Each built-up bracket 40, including the plate sections 41, 42, 43 and 44, has a telescoping relation with a cross arm and each bracket carries a power cylinder 48 providing a downwardly extending piston rod 51 for receiving a suction cup 30. Accordingly the four cross arms provide eight suction cups. As shown in FIG. 6, each suction cup is secured to its piston rod 51 by a ball and socket joint. The circular plate 60 of the suction cup structure is cored centrally to form a center opening 61 and the depending end of a piston rod is reduced in diameter to receive and retain the ball member 62 which is disposed in the opening. The split socket member 63 is associated with the ball member and the parts are retained in operative relation by the collar 64 secured by the screws 65 to the top plate 66. Said top plate in turn is secured by the screws 67, FIG. 7, to the circular plate 60 of the suction cup structure. This locates the collar 64 within the opening 61 and as contemplated by the invention the circular plate 60 has a swivel joint connection with its piston rod 51 as provided by the ball and socket structure.

The scuff plate 70 of each suction cup is backed by a metal plate 71 which is held by the screws 72 to the circular plate 60. The scuff plate is formed with connecting grooves 73 which in turn connect with a suction conduit 74, see FIG. 10. Plate 70 is completely encircled by the flexible sealing lip 75 having a part 76 which is located between the circular plate and the backing plate, being held by the screws 72. The lip 75 is extremely flexible and when the cups are caused to contact the surface of a plate such as 12, the space within the lip is automatically sealed so that when the operator connects the cup to a source of vacuum, the suction created within the shallow cup will securely grip the same to the sheet. The tendency to grip is maintained as long as the required sub-atmospheric pressure exists within the cup.

By reason of the ball and socket connection of the cups on their piston rods it follows that the cups have swivelling movement which could include rotation with respect to the piston rods. This latter movement is not desired since the suction conduits to the cups could become entangled or otherwise fouled. Hence the invention accordingly provides an anti-rotation rod 80 shown in detail in FIG. 7, which shows the rod in parallel relation with the adjacent power cylinder 48. The ball member 81 which is secured to the end of the rod 80 is located between the plate 60 and the top plate 66, and said ball member rests on the bottom of a recess 82 formed in plate 60. The socket part 84 of the ball and socket unit is welded to the underside of plate 66. The ball and socket unit permits full swivelling movement of the suction cup. The antirotation rod 80 extends upwardly to pass through an opening 85 in the fixed guide block 86 and which is completed by the part 87. The completed block is positioned between and is secured by the screws 88 to the plate sections 41 and 42.

The combination of the ball member 81 and the socket part 84 and the fact that the rod 80 extends through an opening in a fixed block 86 allows swivelling of the suction cup but rotation is prevented and fouling of the suction lines does not take place. This swivelling action of the suction cups is highly desirable since it enables the suction cups to seat on and seal themselves to the surface of a plate even though the surface may be undulating and wavy.

Figure 5:
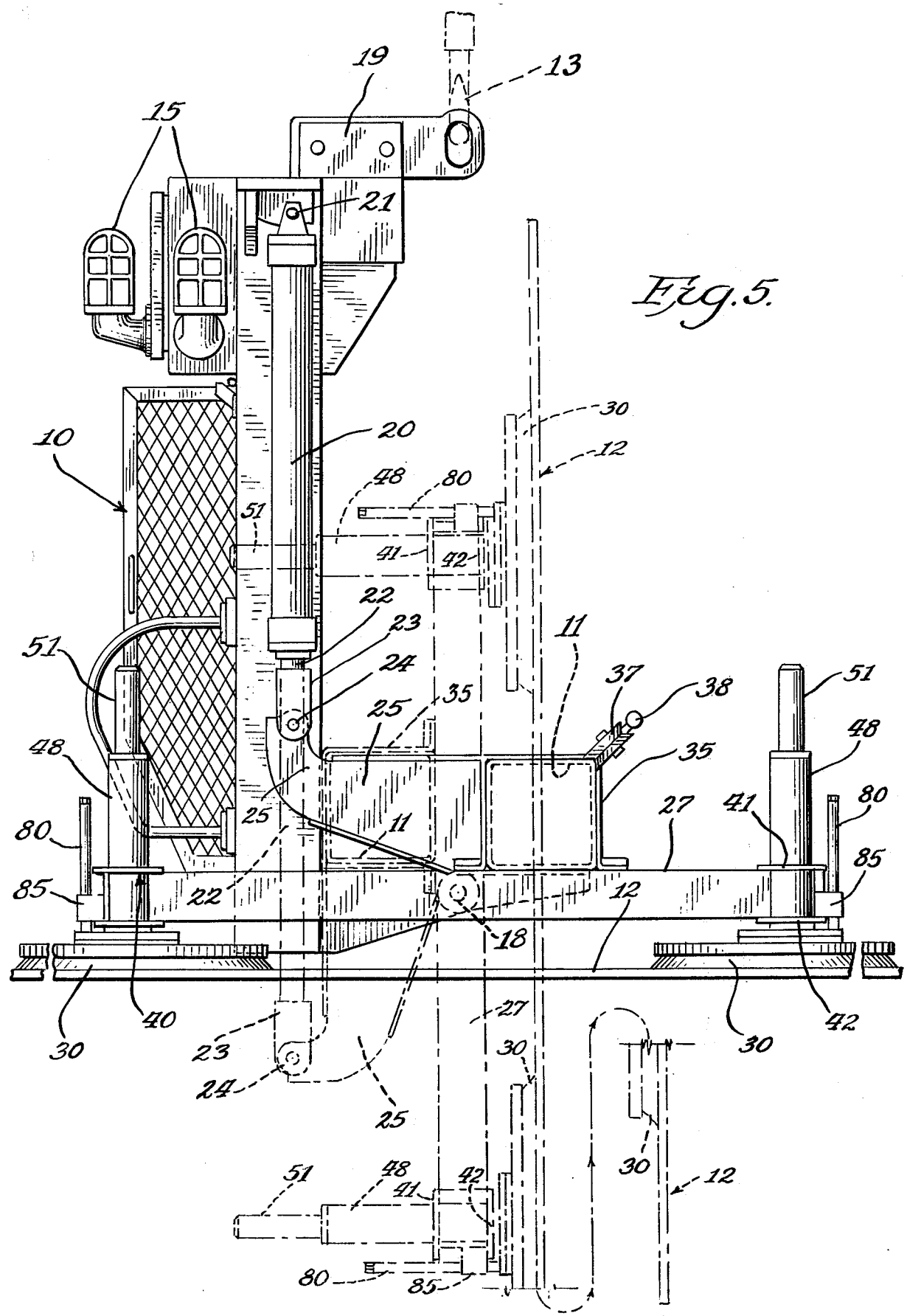
FIG. 5 is a view showing in side elevation the power body portion of the present apparatus and also showing a power cylinder in operative connected relation with a pivotally supported load beam, said view futher illustrating in dotted lines an upending action for a suction supported plate.

In FIG. 5 the load beam 11 and the suction cups 30 are shown in full lines in a horizontal position and the plate adhered to the suction cups is also horizontal. Before the plate is lifted, the cross arms 31 and 32 are positioned on the load beam in desired location as are also the suction cups supported by the same. Then the hand clamps are used to lock the parts in adjusted position. The power cylinders 48 are then activated by the admission of the high pressure medium to the top end of the cylinders to force the suction cups downwardly into surface contact with the plate. The suction can now be applied to the cups and then the plate can be lifted as shown in said Figure. For upending the plate to the position shown in dotted lines, the operator need only admit the pressure medium to the top of the cylinders 20 above the piston thereof to force the piston rod down and by reason of the clevis connection 23 the elbow shaped arm 25 is rotated to turn the load beam on the axis 18 whereby to position the plate vertically.

The power cylinders 48 provide an hydraulic type mounting for the suction cups 30. The reciprocating stroke of the cylinder piston rods 51 enables the suction cups to conform to irregular surfacces which previously were difficult, if not impossible, to grab with vacuum. Major contour irregularities require that the entire cup move towards and from the plate to be lifted and this feature is fully accomplished by the present power cylinders which cause the cups to move out until they contact the surface of a plate. In this manner the power cylinder-suction cup units compensate for an undulating and wavy plate surface.

I claim:

1. In a vacuum plate lifter, the combination with a power body portion adapted to be suspended from a crane or the like, a load beam pivotally supported by the body portion, an hydraulic power cylinder carried by the body portion and having a depending piston rod which is operatively connected to the load beam for bodily rotating the load beam around its pivot axis, a plurality of cross arms carried by the load beam by being disposed below the same and extending transversely of the load beam, respective bracket means connecting each cross arm with the load beam, certain of said bracket means having slidable movement along the length of the load beam, whereby the cross arm supported thereby is also slidable, a power cylinder of the hydraulic type at each end of each cross arm, additional bracket means for adjustably supporting each last mentioned power cylinder on its cross arm in a manner whereby the last mentioned power cylinder is disposed at right angles and has a piston rod depending from its downwardly directed end, and a suction cup having a ball and socket connection with the depending end of the piston rod of each such power cylinder.

2. In a vacuum plate lifter, the combination of a body portion adapted to be suspended from a crane or the like, a load beam pivotally supported by the body portion, power means carried by the body portion and operatively connecting with the load beam for bodily rotating the load beam around its pivot axis, a plurality of cross arms disposed transversely of the load beam and being carried by said beam for movement longitudinally thereof, a bracket supported power cylinder at each end of each cross arm, each power cylinder being disposed perpendicularly of its cross arm and having a piston rod depending from its downwardly directed end, a suction cup having a ball and socket connection with the depending end of the piston rod of each power cylinder, bracket means in associated relation with the load beam and each of said cross arms respectively, for supporting and carrying the cross arm on the load beam, certain of said bracket means having slidable movement on the load beam for adjustably positioning their cross arms, clamp means in associated relation with each slidable bracket means for locking the same in adjusted position, a trolley bracket fixed to the certain of said bracket means which have slidable movement, trolley wheels provided by the trolley bracket and which ride on a corner of the load beam, and a hand clamp in associated relation with the trolley bracket for locking the same and thus its bracket means in position on the load beam.

* * * * *